May 16, 1950     F. A. DE LISLE     2,507,893
PORTABLE WATER PURIFYING CANTEEN
Filed Feb. 8, 1945     2 Sheets-Sheet 2
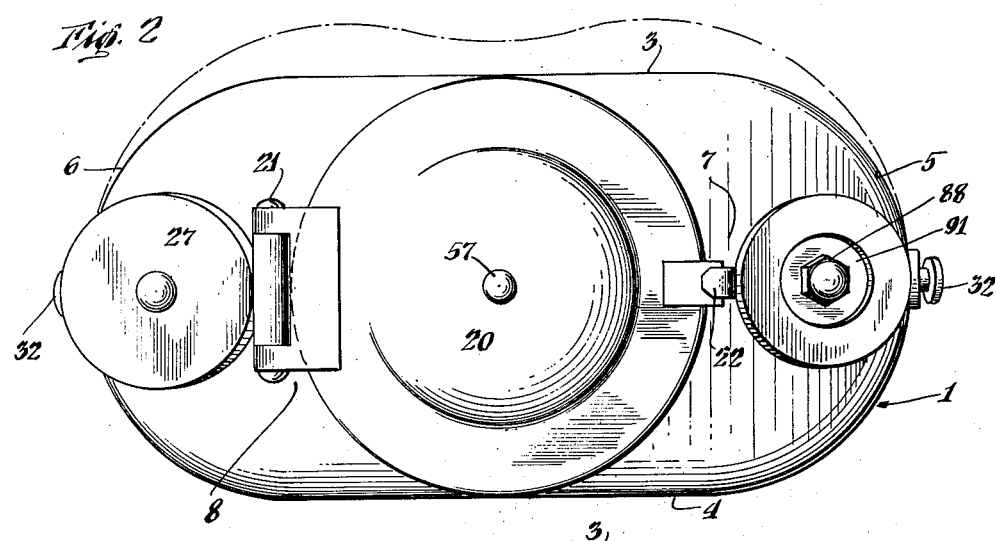
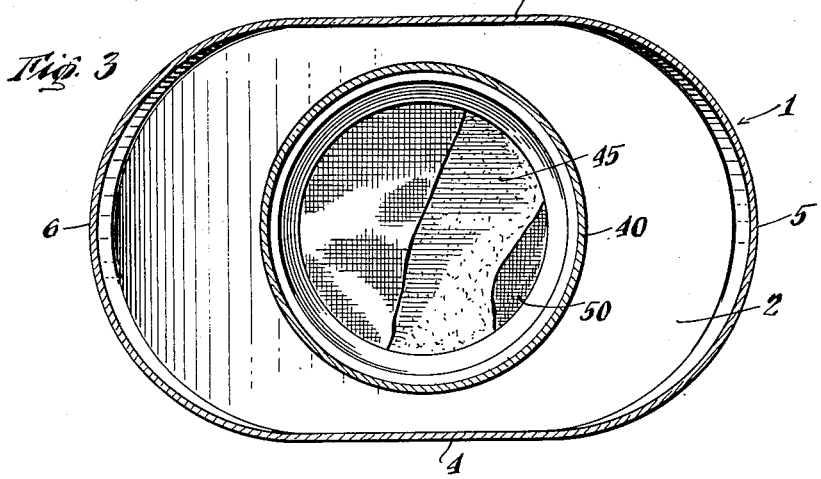
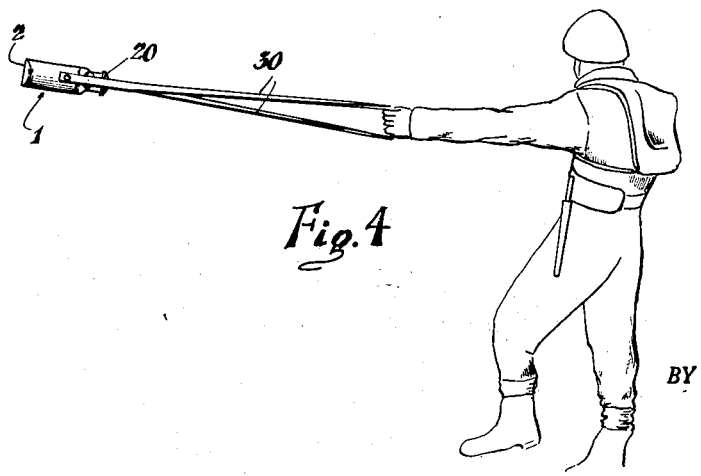
INVENTOR.
F. A. De Lisle
BY Hobart N. Durham
ATTORNEY Patented May 16, 1950

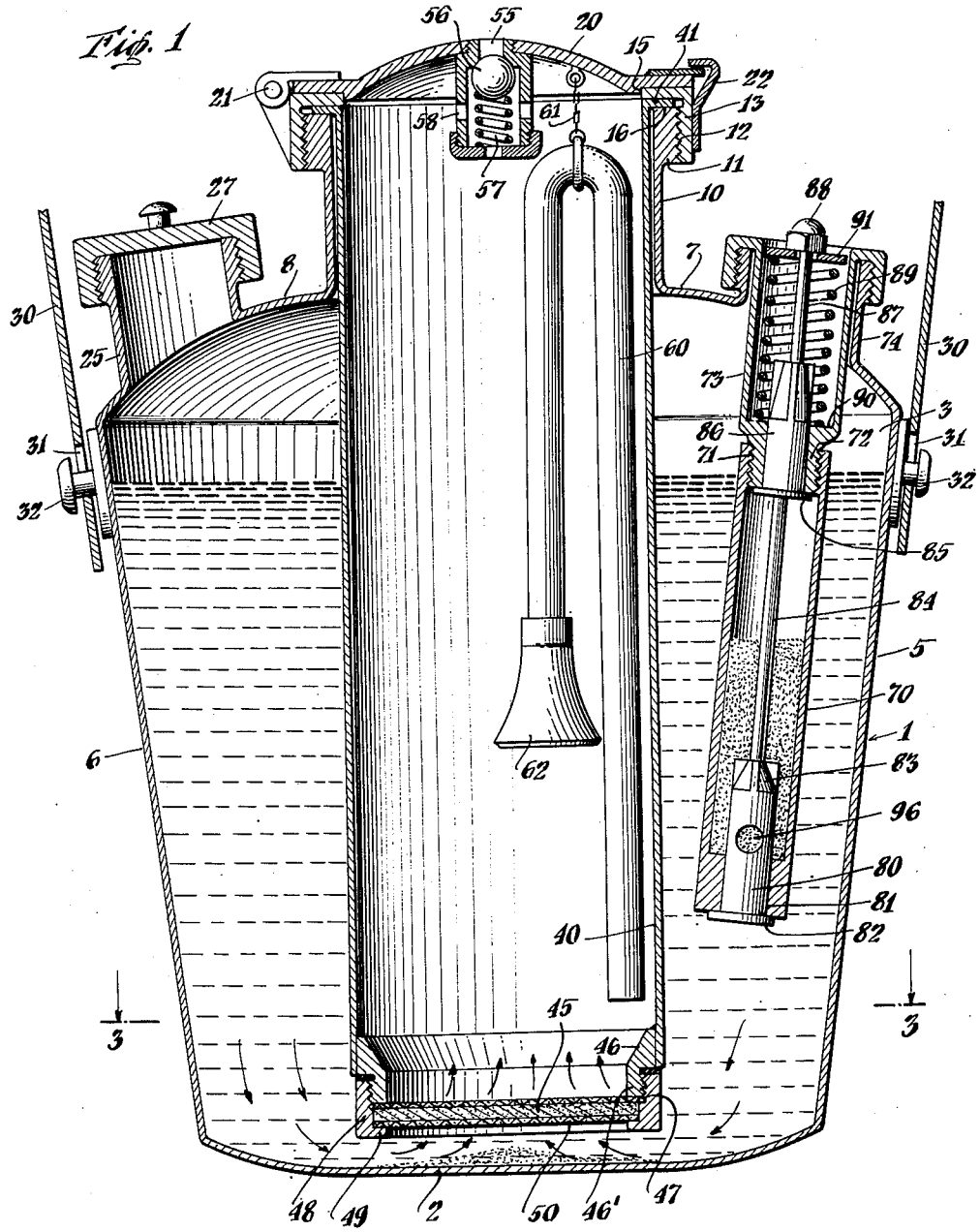

2,507,893

UNITED STATES PATENT OFFICE 2,507,893

PORTABLE WATER PURIFYING CANTEEN

Francis A. De Lisle, Albion, Ind., assignor to George B. Finnegan, Jr., Mountain Lakes, N. J., trustee Application February 8, 1945, Serial No. 576,855

1 Claim. (Cl. 210—95)

The invention relates to water purification and clarification and more particularly to new and useful methods and devices for clarifying and purifying water in a portable canteen or a similar container.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a central vertical section of a canteen embodying the invention;

Fig. 2 is a top plan view of the canteen shown in Fig. 1;

Fig. 3 is a horizontal section taken on line 3—3 of Fig. 1; and

Fig. 4 is a diagrammatic view showing the performance of the method of generating filtering centrifugal force with said canteen.

The invention is directed to providing novel and useful means for clarifying and sterilizing water or other raw fluids; and more especially in conjunction with such fluids carried in canteens or other relatively small portable containers. One object of the invention is to provide means and method for clarifying by filtration action raw water carried in a canteen, centrifugal force being generated manually to provide filtration pressure not normally obtainable in such portable containers. Another object of the invention is to purify or sterilize raw water in a canteen by filtration through a medicated filter medium by means of centrifugal force. Another object of the invention is to provide means for sterilizing raw water in a portable canteen by injecting or adding thereto selected quantity of sterilizing or germicidal fluid, preferably prior to filtration of said water. Another object of the invention is to provide a relatively light and simple canteen construction which may be provided with removable, centrifugally operated filtering devices, said devices being removable from the canteen when pure water may be obtained from outside source, thereby increasing the capacity of such canteen under such conditions. Another object of the invention is to provide a canteen with means assuring individual sterile drinking contact with the liquid in the canteen.

In the tropics and many other parts of the world where clean germ-free water cannot be obtained, it is necessary to provide means for clarifying and sterilizing water before it is drunk by soldiers and other humans. The present invention is directed to providing relatively simple, portable, individual canteen devices in which a high degree of clarification and purification of raw water may be effected quickly and easily by the individual manual operation of the carrier himself without having to carry any substantial quantity of delicate or heavy purifying and clarifying apparatus or other impedimenta. By means of the invention a canteen of substantially standard size and shape is equipped with filtration means which are always at hand and constitute simple and unobtrusive additions to such standard canteen structure. Also, by a novel operating method, the invention makes it possible to generate a very high degree of filtering pressure and thereby insure a maximum clarification and purification of raw water in the minimum of space and time.

It will be understood that the foregoing general description and the following detailed description as well are exemplary and explanatory but are not restrictive of the invention.

Referring now in detail to the present preferred embodiment of the invention illustrated by way of example in the accompanying drawings, the invention provides a hollow canteen body or container 1 having a preferably flat bottom 2 with flat vertical side walls 3 and 4 and rounded upwardly and outwardly inclined end walls 5 and 6. The invention is not specifically limited to this particular shape of canteen, but same is illustratively shown as being of relatively standard canteen design and adapted for portability, compactness and adaptability to the other features of the invention hereinafter described. It will be understood, however, that the principles of the invention are also applicable to containers of cylindrical, square and other cross-sectional shapes.

The upper or top portion of the container 1 comprises two upwardly and inwardly curved shoulders 7 and 8 which terminate to merge with a vertical cylindrical column or neck 10 which projects upwardly from its junction with said shoulders 7 and 8 to form an upstanding central elevated neck portion of the canteen. The upper portion of said column 10 is thickened at 11 to provide a flanged shoulder, the perimeter of which is threaded at 12 to receive a cap-supporting internally threaded ring 13 which is screwed onto the ring 11. Ring 13 is provided with an inwardly projecting top flange 15 which is normally spaced from and overlies the upper flat rim 16 of the ring 11. An upwardly domed lid or cap 20 is seated on top of the flange 15 of ring 13, being pivotally connected thereto at one side by the hinge 21 and normally held in closed position at the opposite side by a spring latch 22.

An inlet for raw or fresh water into the container 1 is preferably provided on the shoulder portion 8 thereof, said inlet comprising an upstanding cylindrical column 25 which is externally threaded at its upper enlarged end portion to receive an internally threaded cup-like cap 27 which fits thereon.

As described thus far, the container 1 may be used as a simple portable canteen when pure water or other fluid is readily obtainable. Said canteen may be carried from the shoulder or harness of the wearer by means of shoulder strap 30, the ends of which are provided with swivel links 31 adapted to pivotally engage capped studs 32 which project from either side of the canteen.

When, in accordance with the invention, it is desired to provide clarification and medicated filtration of the water introduced into the container 1 through the inlet 25, an internal auxiliary container is mounted within the external container 1. Said internal container comprises a cylindrical casing 40 which fits within the neck 10 and hangs from the top thereof to near the bottom 2 of the outer casing. Said internal container is provided with top annular flange 41 which overlies the top 16 of the ring 11 and is tightly held thereagainst by a screw cap 13. The bottom end of the internal casing 40 is provided with means for supporting a porous filter pad or other filter medium 45 which, as shown, may comprise a pad of medicated paper or cloth. Said filter medium 45 is preferably in the form of a circular disc and is adapted to be seated against the bottom end of the cylindrical container 40. For this purpose a dependent annular bushing 46 may be fixed to the bottom of said cylindrical container 40 and extend downwardly therefrom, being provided with external threading 47. The filter cap 45 is adapted to rest against the bottom 46' of said bushing 46 and is held in place thereagainst by an internal ring 48 which engages the threads 47 and is provided with an inwardly disposed flange 49 which engages the bottom edge of the filter cap and presses same tightly against the bottom edge of the bushing 46. A metal screen or other foraminous strengthening membrane 50 may be provided to lend additional support to the filter pad, if desired.

It will be noted that the filter pad 45 and its supporting ring 48 lie a short distance above the bottom 2 of the outer container 1, thereby providing access by the water in said outer container so that same may pass through filter pad to the inner container 40.

When the outer container 1 is filled with water, it will be recognized that such raw water will tend, by gravital level-seeking action, to penetrate the filter pad 45 and rise in the container 40. This tendency, however, will be limited by the flow resistance of the filter pad itself and such gravital flow will therefore be slow and inadequate.

In accordance with the invention I therefore provide auxiliary means for generating a relatively greatly increased filtration pressure so as to cause the raw water in the outer container to be forced through the pad 45 and into the inner container 40 by centrifugal force. In order to generate such centrifugal force, the carrier of the canteen is required merely to unsling same from his shoulder and whirl the canteen around his head either vertically or horizontally in the manner of a sling, doing so by grasping the strap 30 and allowing the canteen to whirl as indicated in Fig. 4, for example. This manual whirling operation will generate a very greatly increased filtration action, that is, many times that of gravity, in accordance with well known principles of centrifugal displacement. Accordingly the container 40 may be quickly completely filled with water which has been purified and sterilized by passing through the filter pad 45. For some cases of water-purification, the pad 45 may be formed as a ceramic diffusion medium, or as a perforated baffle plate.

In order to facilitate the flow of water into said container 40 under the centrifugal action thus generated, it is desirable to vent therefrom air which is compressed by the entrance of liquid into the container 40. For this purpose I provide a centrifugally displaced one-way valve or vent in the lid 20 of the canteen. As an example of such a valve there is shown a vent 55 in the cap 20, which vent is normally closed by a ball 56 held against the vent by spring 57 in apertured housing 58. Under centrifugal action said vent is caused to open as the weight of ball 56 opposes the action of the spring, thereby tending to vent air compressed within the container by the entrance of the filtered water. A similar vent and valve (not shown) will be provided in the outer cover 8 to prevent formation of a counter vacuum within said outer container 1.

To prevent the formation of a countervailing vacuum in the outer container 1 as the water is forced into the inner container, the inlet spout 25 may be left wholly or partly open during the whirling action by unscrewing the cap 27.

If desired, the invention may provide an individual sterile drinking tube for the user which will avoid his having to place his lips on any external portion of the canteen which may have become contaminated. For this purpose a flexible tube 60, preferably formed of synthetic rubber or other flexible inert material is hung within the container 40, as by means of a chain 61, fixed to the inner surface of the hinged lid 20. A mouthpiece 62 may be provided at one end of the dependent tube. As will be observed from the drawing when the lid is open, the mouthpiece is drawn out and rendered available for sucking water out of the container.

The invention further provides, as an additionally desirable feature thereof, means for introducing selected and measured quantities of a sterilizing or purifying chemical into solution with the raw water in the container 1, whereby to purify said water by such medication alone or for furthering purification thereof in connection with the filtering action already described. For this purpose an injection device is mounted on the shoulder 7 of the container 1, by means of which measured small quantities of any desired chemical solution, such as a concentrated aqueous solution of copper sulphate, may be injected into the water in the container 1. As shown, a cylindrical tube 70 for containing such chemical solution, is suspended within the outer container 1. the upper end of said tube 70 being internally threaded at 71 to screw onto the externally threaded plug 72 of a tubular housing 73 which projects downwardly from the shoulder 7 of the container. The upper end of said housing 73 is outwardly flanged and threaded to screw onto the upstanding column 74 rising from the shoulder 7.

Means for forcing a measured portion of the chemical solution carried within the tube 70 under pressure into the water in the container 1 are provided in the form of an injector plunger manually operated from outside the water container. As shown, said plunger comprises a piston head 80 which is slidable within the reduced end portion 81 of the tube 70 and at its lower end is provided with an enlarged cap 82 which lies outside and normally against the bottom end of said tube 70. The upper end of said piston head 80 is reduced at 83 to join a stem 84 which extends upwardly through the tube 70 and joins the flanged lower end 85 of the upper plunger body 86 which is slidable within the end 72 of the casing 73. The upper end of said body 86 is connected to a reduced stem portion 87 which extends upwardly and terminates in a button 88. Said stem is surrounded by a compressible helical spring 89, the lower end of which rests against the internal shoulder 90 of the casing 73, while the upper end bears against the cap 91 of the plunger.

Referring again to the lower end 80 of the plunger, same is provided with a socket 96 normally lying within the solution in the tube 70. It will be seen that when the button 88 is depressed against the spring 89, the plunger head 80 will be forced downwardly, carrying with it a measured portion of the solution within the socket 96. The pressure so generated will eject that portion of liquid into the water in the container and each time the plunger is so depressed, a similar additional quantity will be injected. Thus any measured amount of medicated fluid or sterilizer may be added to the raw water in the canteen by the operator. Preferably the injector will be actuated before the container 1 is filled to the level of the plunger end 82, so that dilution of the sterilizing material in the tube 70 will be avoided.

The invention in its broader aspects is not limited to the specific mechanisms shown and described but departures may be made therefrom within the scope of the accompanying claim without departing from the principles of the invention and without sacrificing its chief advantages.

What I claim is:

A portable water purifying canteen including in combination a water container for holding raw water, a pure water vessel mounted within said container concentric therewith, said vessel being fixed with respect to the container, the bottom of said vessel being spaced a short distance from the bottom of the container, a filter medium in the bottom of the vessel, said medium constituting the sole means for travel of water from the container into the vessel, said filter medium having such resistance to liquid flow that the static head of raw water in the container when full is insufficient to cause water to flow into the vessel through said medium, and a strap or the like attached to the container adjacent to the top thereof and being several times greater in length than the liquid-containing depth of said container whereby the canteen may be swung in an orbit to induce centrifugal flow of water from the container through the filter medium into the vessel.

FRANCIS A. DE LISLE.

REFERENCES CITED

The following references are of record in the file of this patent:

UNITED STATES PATENTS

| Number | Name | Date |
|---|---|---|
| 148,513 | Senderling | Mar. 10, 1874 |
| 373,377 | Rice | Nov. 15, 1887 |
| 855,820 | Stebbins | June 4, 1907 |
| 976,148 | Caps | Nov. 22, 1910 |
| 1,262,146 | Ward et al. | Apr. 9, 1918 |
| 1,720,326 | Halstead et al. | July 9, 1929 |
| 1,883,967 | Krause | Oct. 25, 1932 |
| 2,063,778 | Andrus | Dec. 8, 1936 |
| 2,369,232 | Hinton | Feb. 15, 1945 |

FOREIGN PATENTS

| Number | Country | Date |
|---|---|---|
| 1,033 | Great Britain | Jan. 13, 1898 |
| 187,429 | Great Britain | Oct. 26, 1922 |
| 517,289 | Germany | Feb. 3, 1931 |
| 574,144 | Germany | Apr. 10, 1933 |